United States Patent
Wadia et al.

(10) Patent No.: US 7,320,575 B2
(45) Date of Patent: Jan. 22, 2008

(54) METHODS AND APPARATUS FOR AERODYNAMICALLY SELF-ENHANCING ROTOR BLADES

(75) Inventors: Aspi Rustom Wadia, Loveland, OH (US); Peter Nicholas Szucs, West Chester, OH (US); Syed Arif Khalid, Indianapolis, IN (US); Peter John Wood, Loveland, OH (US); Kevin R. Kirtley, Scotia, NY (US); Xiaoyue Liu, Clifton, NY (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 10/952,184

(22) Filed: Sep. 28, 2004

(65) Prior Publication Data

US 2006/0067821 A1    Mar. 30, 2006

(51) Int. Cl.
*B63H 1/14*    (2006.01)

(52) U.S. Cl. .................... 416/97 R; 415/115; 415/116

(58) Field of Classification Search .............. 416/97 R, 416/97 A; 415/115, 116
See application file for complete search history.

(56) References Cited

U.S. PATENT DOCUMENTS

| | | | |
|---|---|---|---|
| 1,829,674 A | 10/1931 | Rosenochler | |
| 2,156,133 A | 4/1939 | Troller | |
| 3,540,810 A * | 11/1970 | Kercher | 416/90 R |
| 4,726,737 A | 2/1988 | Weingold et al. | |
| 5,059,093 A | 10/1991 | Khalid et al. | |
| 5,088,892 A | 2/1992 | Weingold et al. | |
| 5,167,489 A | 12/1992 | Wadia et al. | |
| 5,480,284 A | 1/1996 | Wadia et al. | |
| 5,642,985 A | 7/1997 | Spear et al. | |
| 5,725,354 A | 3/1998 | Wadia et al. | |
| 5,772,397 A * | 6/1998 | Morris et al. | 415/115 |
| 6,071,077 A | 6/2000 | Rowlands | |
| 6,135,715 A * | 10/2000 | Correia | 416/97 R |
| 6,195,983 B1 | 3/2001 | Wadia et al. | |
| 6,224,336 B1 * | 5/2001 | Kercher | 416/97 R |
| 6,299,412 B1 | 10/2001 | Wood et al. | |
| 6,312,219 B1 | 11/2001 | Wood et al. | |
| 6,328,533 B1 | 12/2001 | Decker et al. | |
| 6,438,941 B1 | 8/2002 | Elliott et al. | |
| 6,554,569 B2 | 4/2003 | Decker et al. | |
| 6,568,909 B2 | 5/2003 | Szucs et al. | |
| 6,672,829 B1 | 1/2004 | Cherry et al. | |
| 6,715,988 B2 * | 4/2004 | Leeke et al. | 416/97 R |
| 6,732,502 B2 | 5/2004 | Seda et al. | |
| 6,779,979 B1 | 8/2004 | Wadia et al. | |

(Continued)

FOREIGN PATENT DOCUMENTS

GB    209435    11/1924

(Continued)

*Primary Examiner*—Hoang Nguyen
(74) *Attorney, Agent, or Firm*—William Scott Andes; Armstrong Teasdale LLP

(57) ABSTRACT

An airfoil having a root, a tip, and an outer surface for pressuring air flowable thereover. The outer surface includes one or more slots elongate in a direction selected to preclude or reduce circulation within the slots, and the one or more slots are configured to bleed a boundary layer from the outer surface to the tip utilizing one or more passageways within the airfoil.

20 Claims, 9 Drawing Sheets

U.S. PATENT DOCUMENTS

| | | |
|---|---|---|
| 6,790,005 B2 | 9/2004 | Lee et al. |
| 2004/0079084 A1 | 4/2004 | Kirtley et al. |
| 2004/0091361 A1 | 5/2004 | Wadia et al. |

FOREIGN PATENT DOCUMENTS

| | | |
|---|---|---|
| GB | 736835 | 9/1955 |
| GB | 1 532 815 | 11/1978 |
| GB | 2 344 618 A | 6/2000 |
| GB | 0519068.1 | 1/2006 |
| JP | 7301102 A | 11/1995 |

\* cited by examiner

METHODS AND APPARATUS FOR AERODYNAMICALLY SELF-ENHANCING ROTOR BLADES

BACKGROUND OF THE INVENTION

This invention relates generally to methods and apparatus for increasing efficiency of airfoils, and more particularly to methods and apparatus for extracting from boundary layers of airfoils.

A gas turbine engine such as that configured for powering an aircraft in flight conventionally includes in serial flow communication a fan, a compressor, a combustor, a high pressure turbine (HPT), and a low pressure or power turbine (LPT). Ambient air enters the fan wherein it is initially pressurized, and in turn a portion thereof flows to the compressor wherein it is further pressurized and discharged to the combustor wherein it is mixed with fuel and ignited for generating hot combustion gases which flow downstream to the HPT. The HPT includes one or more stages of turbine blades specifically configured for extracting energy from the combustion gases for powering the compressor through a shaft connected therebetween. The combustion gases lose pressure in the HPT and then flow to the LPT which includes additional turbine blades also configured for extracting additional energy from the lower pressure combustion gases for powering the fan connected thereto by another shaft.

The fan and compressor include respective rotor blades which are configured for pressurizing the relatively cool air which is in contrast to the turbine blades of the HPT and the LPT which are configured for extracting energy from the hot combustion gases with a resulting reduction in pressure thereof. The energy extracted from the combustion gases is in turn imparted to the air being pressurized in the fan and compressor.

Rotor blades, fan blades, and compressor blades all represent types of airfoils. Both fan blades and compressor blades are effective for imparting energy into the air for increasing its pressure to different levels. Fan blades are relatively large for moving larger amounts of airflow at reduced pressure for providing a substantial portion of propulsion thrust from an engine. Fan blades are typically configured in one or two stages for use in conventional high bypass, turbofan, commercial aircraft engines or lower bypass military engines.

Rotor blades found in a typical axial compressor are configured in a substantial number of axial stages with each succeeding stage having smaller and smaller rotor blades for incrementally increasing pressure of the airflow channeled therethrough.

A large portion of the aerodynamic losses of transonic rotor blades and most of the aerodynamic losses of subsonic rotor blades are localized in boundary layers around the blade and the hub flowpath.

In at least one known configuration, blade surface, hub contour boundary layers, and tip clearance leakage flows develop without interruption to derate and limit potential performance and aerodynamic stability of compressive rotor blading. Incurred losses are passed on to downstream blading in the form of wakes and vortices that interact with the downstream blading to create further losses, possible aerodynamic instabilities, and noise.

U.S. Pat. No. 5,480,284 to Wadia, et al. describes a self-bleeding rotor blade and method of operation for reducing boundary layer thickness for improved performance. The rotor blade includes a suction surface configured for pressurizing air flowable thereover with bleed apertures being disposed therein for bleeding a portion of the boundary layer air from the suction surface during operation and thereby decreasing its thickness for improving aerodynamic performance of the blade.

BRIEF DESCRIPTION OF THE INVENTION

The present invention provides further improvements in aerodynamic performance over known configurations. Thus, in one aspect, the present invention provides an airfoil having a root, a tip, and an outer surface for pressuring air flowable thereover. The outer surface includes one or more slots elongate in a direction selected to preclude or reduce circulation within the slots, and the one or more slots are configured to bleed a boundary layer from the outer surface to the tip utilizing one or more passageways within the airfoil.

In another aspect, the present invention provides a transonic airfoil on a rotor. The airfoil is configured to bleed off a portion of a lossy boundary layer along a surface of the airfoil into internal channels of the airfoil, utilizing either or both of a centrifugal field of the rotor or a prevailing static pressure gradient, to locations of the airfoil where the bled off portion is reingested to enhance at least one of performance or aerodynamic stability of the rotor.

In yet another aspect, the present invention provides a method for operating an airfoil on a rotor. The method includes utilizing either or both of a centrifugal field of the rotor or a prevailing static pressure gradient to bleed off a portion of a lossy boundary layer along a surface of the airfoil into internal channels of the airfoil. The method also includes reingesting the bled off portion at locations of the airfoil selected to enhance at least one of performance or aerodynamic stability of the rotor.

Further improvement in at least one of performance, aerodynamic stability, and/or quality of aerodynamic flow field is achieved in various configurations of the present invention.

Configurations of the present invention will thus be seen to provide an improvement in fan or compressor blade performance that can increase efficiency and stall margin at increased stage compression ratios. In turn, thrust may be increased with reductions in weight and fuel consumption, and fewer stages may be used in a typical compressor. Reduced aeromechanical excitation and improved noise characteristics may also be obtained by as a result of the gain in performance. Lower turbine temperatures may also be obtained from improved fan and compressor performance for increasing hot section life.

BRIEF DESCRIPTION OF THE DRAWINGS

FIG. 2 is intended for explanatory purposes and is not necessarily an exact representation of a pressure map of any particular configuration of a blade or airfoil.

DETAILED DESCRIPTION OF THE INVENTION

As used herein, the term "blade" is used to refer to a type of airfoil suitable for use in conjunction with a rotor. However, the present invention is not limited to blades and is more generally applicable to all types of airfoils.

Various configurations of the present invention utilize available centrifugal energy of a rotor to remove, invigorate, and reingest blade and hub surface boundary layers to thereby improve performance, aerodynamic stability, and noise generation of a compression component. More specifically, a portion of the lossy blade and hub surface boundary layer is bled off, pumped up, and channeled through a hollowed out region of the blade. This boundary layer in some configurations is re-ingested into the main flow for the added purpose of redirecting and mixing with tip clearance flow and/or blowing the trailing edge wake. Configurations of the present invention are particularly useful for swept blading, in which surface boundary layers are pooled as a result of sweep-induced radial flow migrations.

To realize an improvement in the performance and aerodynamic stability of a rotor, a portion of the lossy boundary layer along the blade surface and the hub contour is bled off into an internal portion of the blading through bleed slots or individual bleed holes. These slots or holes are placed at strategically located radial and chordwise locations on the blade. The removed surface boundary layer is energized and pumped through internal channels in the blading by the centrifugal field of the rotor and the prevailing static gradient to locations on the blade at which it is re-ingested. This re-ingesting provides a further enhancement to the performance and/or aerodynamic stability of the rotor. In some configurations, the location(s) on the blade at which re-ingestion occurs are at the blade tip so that a tip clearance flow field/vortex is beneficially altered and/or at the blade trailing edge to partially or fully dissipate a portion of the wake of the rotor. In addition to providing net gains in rotor performance (as measured by aerodynamic gains minus pumping work and losses) and/or aerodynamic stability, the suction and re-ingestion of the energized boundary layer also yields further gains as a result of improvement in the performance, stability and noise of downstream blading. These gains are a consequence of lower rotor tip wake and tip vortex strength. In some configurations, injection is accomplished via miniature vanes submerged from the tip. These submerged vanes provide lower loss and higher flow than simple holes or slots.

Analytical studies indicate that performance improvements of 1.0 points can be expected, as well as an aerodynamic stability improvement of 3-5% and a noise benefit of 2-3 dB. Only that portion of the boundary layer is sucked off that is at an efficiency level that is equal to or less than that of the centrifugal pumping efficiency.

Figure 1:
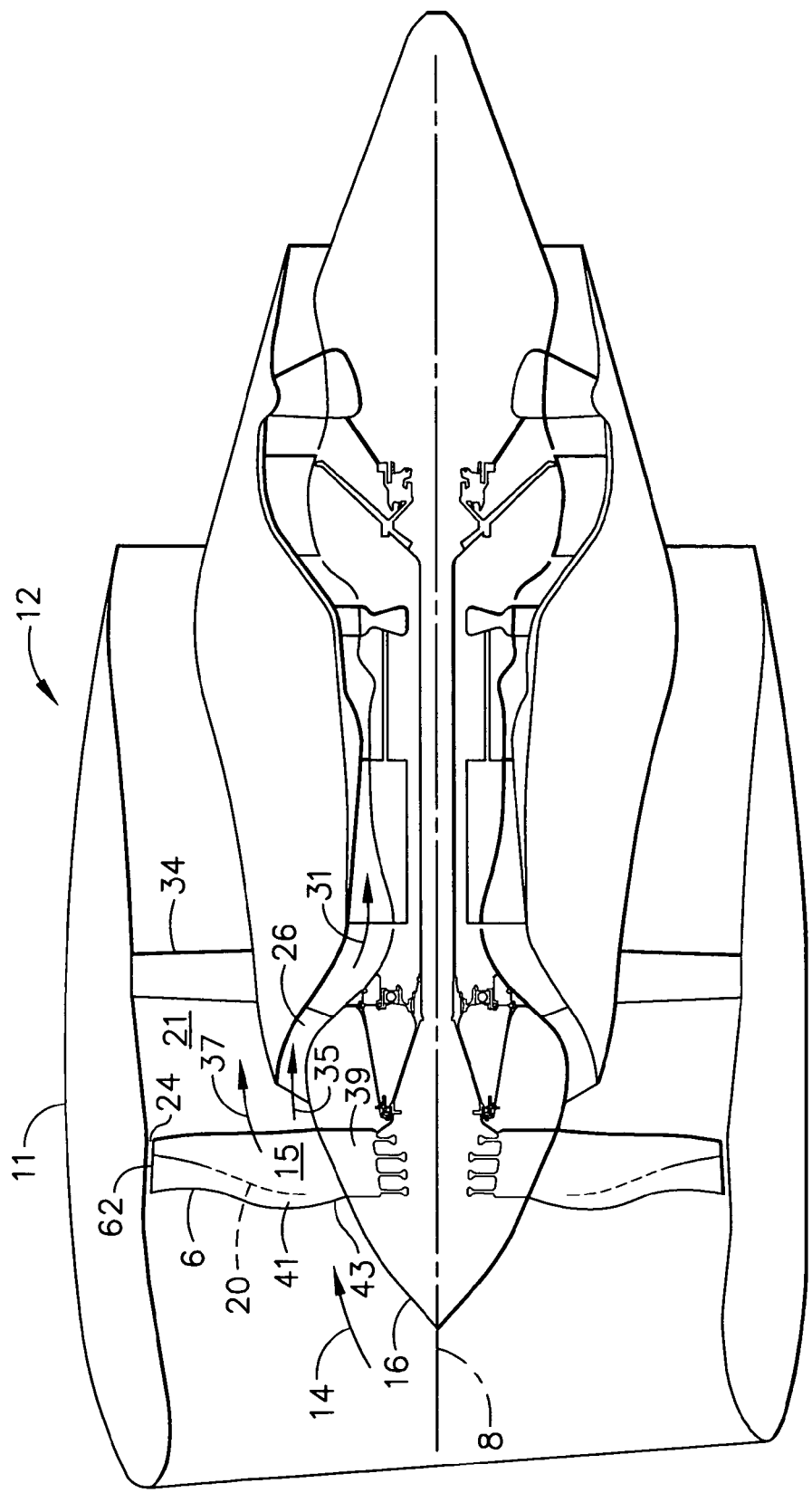
FIG. 1 is a longitudinal section of an engine incorporating blades or airfoils of the present invention.

More specifically, in some configurations and referring to FIG. 1, blades or airfoils 15 are provided on rotors of a jet engine 12. A centerline 8 is an axis of symmetry; a mirror image of the portion shown above centerline 8 would appear below axis 8, but is omitted from FIG. 1. Inlet air is represented by arrow 14. In some configurations, engine 12 includes an outer case 11, a bullet nose 16 and a including blade 15, the latter having a leading edge 6, a tip 62, and a blade root 43. Leading edge 6 is contoured in a combined sweep manner, going from root 43 to tip 62. Disks 39 at a root of blade 15 carry the load on the fan. Blades 15 are put into disks 39 with dovetails (not shown in FIG. 1).

When blade 15 is operated in a transonic manner, a standing shock wave 20 is developed on blade 15. A small gap 24 is provided between blade 15 and outer case 11. Air 37 passing blade 15 enters a bypass duct 21, whereas some air 35 enters a precompressor or low pressure compressor 26 and continues as flow 31. Air flow 31 continues past a front frame strut 34. Blade 15 has a suction surface 41 configured to pressurize air flowing thereover.

Figure 2:
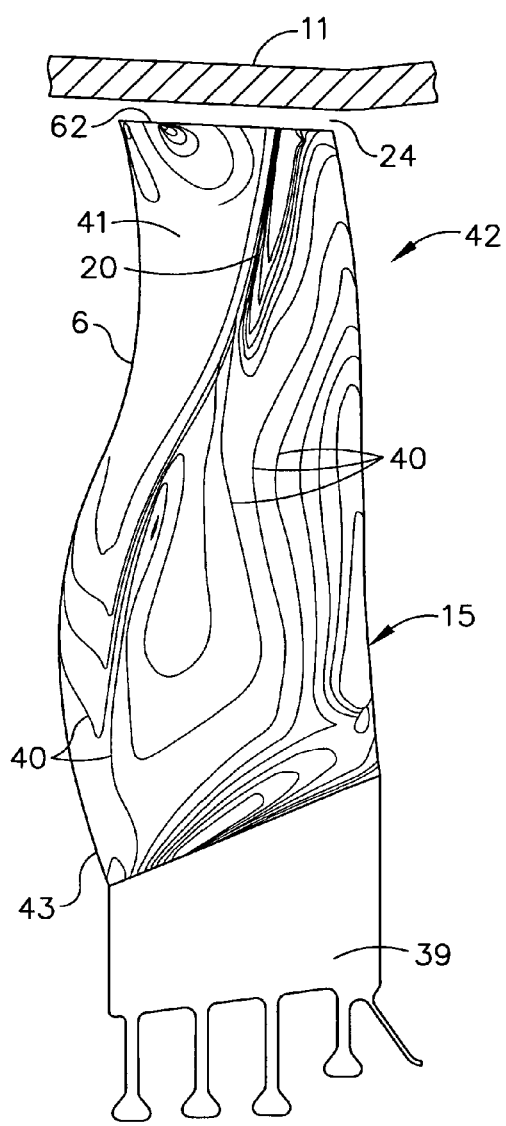
FIG. 2 is a static pressure map generally representative of configurations of blade 15 useful in engines of the type shown in FIG. 1.
Figure 4:
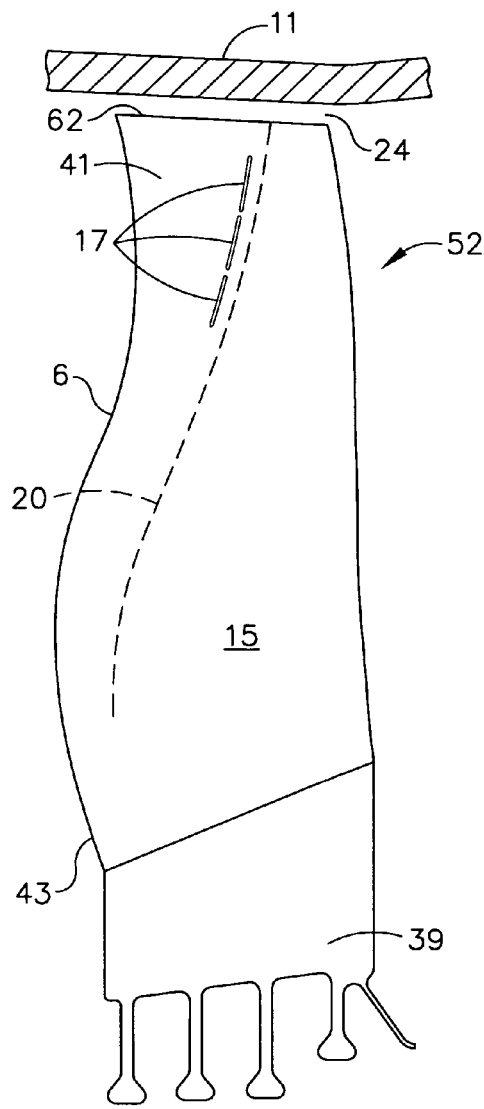
FIG. 4 is a representation of a blade having a row of slots aligned on a line of constant static pressure upstream of a passage shock.
Figure 5:
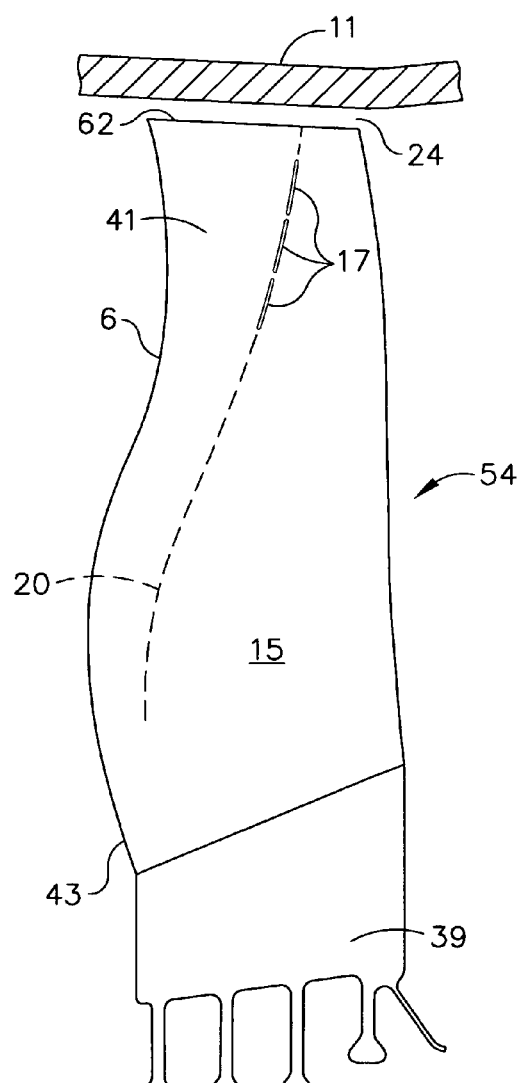
FIG. 5 is a representation of a blade having a row of slots aligned on a line of constant static pressure at a passage shock.

Lines 40 of equal static pressure on blade 15 are represented on pressure map 42 such as that shown in FIG. 2. (FIG. 2 is intended for explanatory purposes and is not necessarily an exact representation of a pressure map 42 of any particular configuration of blade 15. Furthermore, the invention can be used in either or both fans and compressors.) In some configurations and referring to FIGS. 3, 4, and 5, a row of one or more slots 17 is provided on surface 41 of blade 15. In various configurations, slots 17 are elongate along lines 40 of constant static pressure or other direction such that circulation within the slots is precluded or at least reduced relative to the circulation that would occur in configurations having other types of apertures or other arrangements of the apertures. For example, slots 17 are elongate in a direction of constant static pressure in some configurations, and in some configurations having more than one slot per row, slots 17 are arrayed along the direction of constant static pressure as indicated by pressure map 42. A preferred line defining the elongate direction of slots 17 and rows of slots 17 can be determined using computational fluid dynamics (CFD) techniques.

Figure 3:
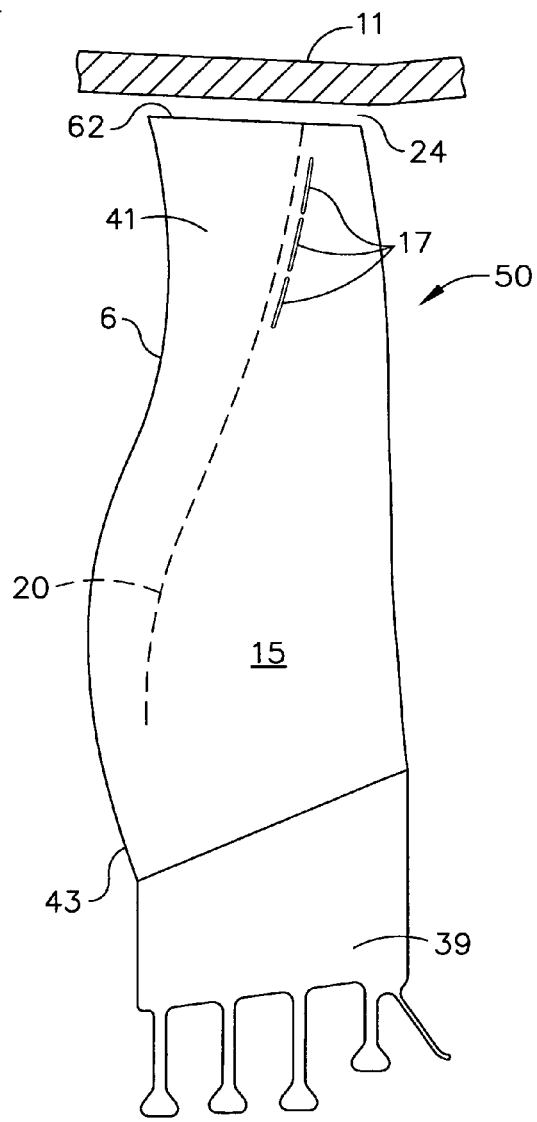
FIG. 3 is a representation of a blade having a row of slots aligned on a line of constant static pressure downstream of a passage shock.

For example, configuration 50 represented in FIG. 3 has slots 17 arranged in a row of constant static pressure downstream of passage shock 20. Configuration 52 represented in FIG. 4 has slots 17 arranged in a row of constant static pressure upstream of passage shock 20. Configuration 54 represented in FIG. 5 has slots 17 arranged in a row of constant static pressure, which in this case is along shock wave 20. Slots 17 advantageously draw air out of a lossy boundary layer close to blade 15. Slots 17 provide a larger area coefficient than would cylindrical holes located in the same locations, unless the cylindrical holes were very large. For example, in some configurations, cylindrical holes replacing slots 17 would have to cover twice the area of blade 15 to achieve the same effectiveness in capturing boundary layer flow as slots 17.

The present invention does not require that blade 15 be operated in a transonic mode. However, in some configurations, the elongate direction of slots 17 and the arrangement of slots 17 in rows is determined in accordance with lines 40 of equal pressure that are or would be defined across blade 15 were blade 15 operated in a transonic mode. (When a blade such as blade 15 is operated in other than transonic mode, the overall directions of contour lines 40 on surface 41 are similar to those when blade 15 is operated in transonic mode, except that the intensities represented by the contour lines are reduced and a passage shock is not formed. Because directions on the pressure map remain substantially similar, a preferred elongate direction of the slots is substantially the same irrespective of the operating speed of the blade.) In some configurations, the location of slots 17 (e.g., the particular line 40 of constant static pressure on which slot or slots 17 are located) are selected to enhance at least one of performance, aerodynamic stability, and/or quality of aerodynamic field flow. Thus, a design choice in some configurations can be made to select a line 40 of constant static pressure that enhances performance in takeoff conditions, where the efficiency penalty of the engine is greatest and the potential benefit to be realized by the inventive configuration is maximized. Other configurations may utilize a design choice that places the slots along a different line 40 of constant static pressure that provides enhances performance during cruise conditions.

The position of shock 20 along blade 15 may vary somewhat depending upon the operational mode of blade 15. However, the position and orientation of shock 20 and the lines 40 of constant static pressure are well-defined at every operational mode of blade 15. Therefore, only limited locations and orientations of shock 20 and lines 40 of constant static pressure are relevant for determining the orientation of slots 17 in any configuration of a blade 15.

The air pressure on the pressure side of blade 15 is greater than on the suction side of blade 15, so air in the casing of blade 15 is forced from the pressure side to the suction side. In some configurations, air is reinjected in a chordal direction and not more than an angle of 30 degrees relative to the tip chordal direction for the sake of efficiency and to provide the least disturbance in the tip region.

Figure 6:
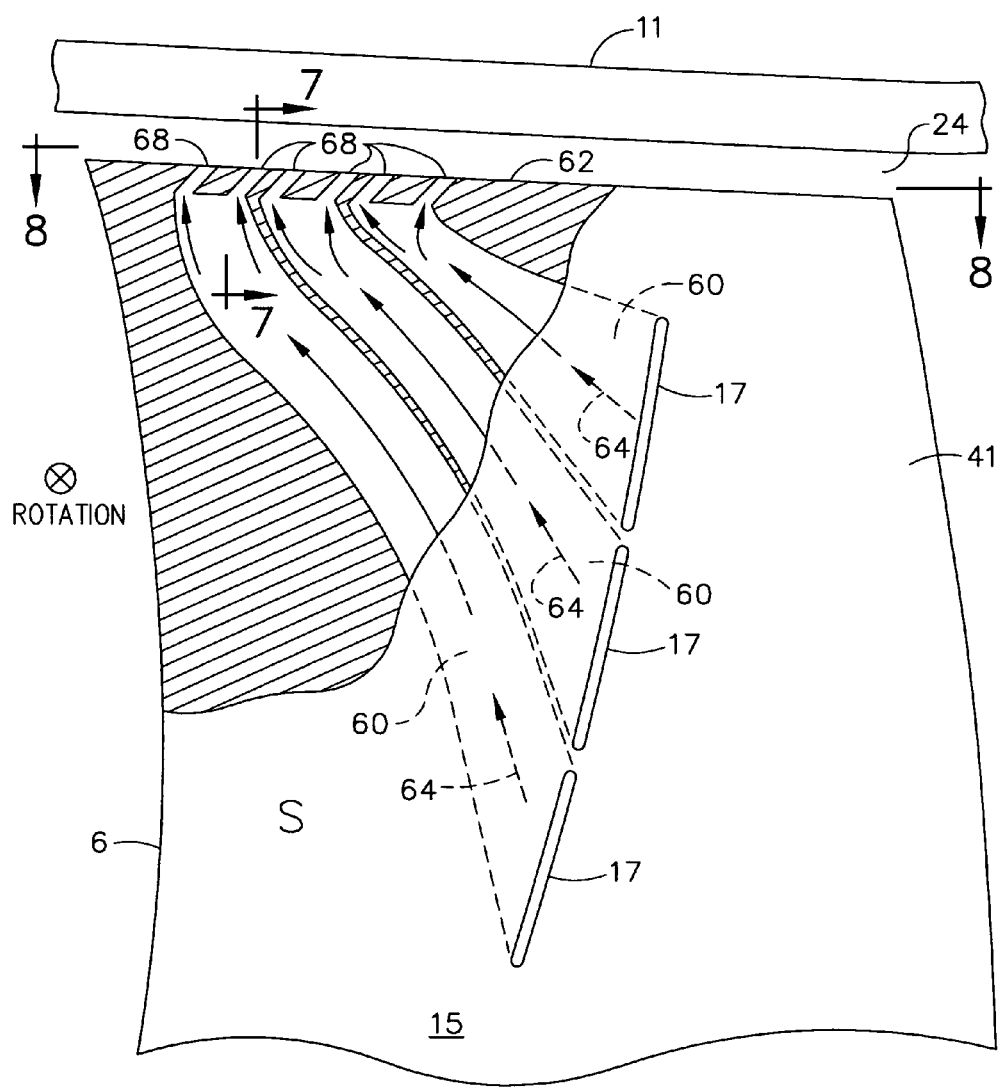
FIG. 6 is a fragmentary view of the blade represented in FIG. 3 (i.e., a blade having a row of slots downstream of the passage shock), looking at the suction side of a blade (rotating in a direction into the plane of the Figure, i.e., away from the viewer). A cut-off portion shows the interior structure of the blade.
Figure 7:
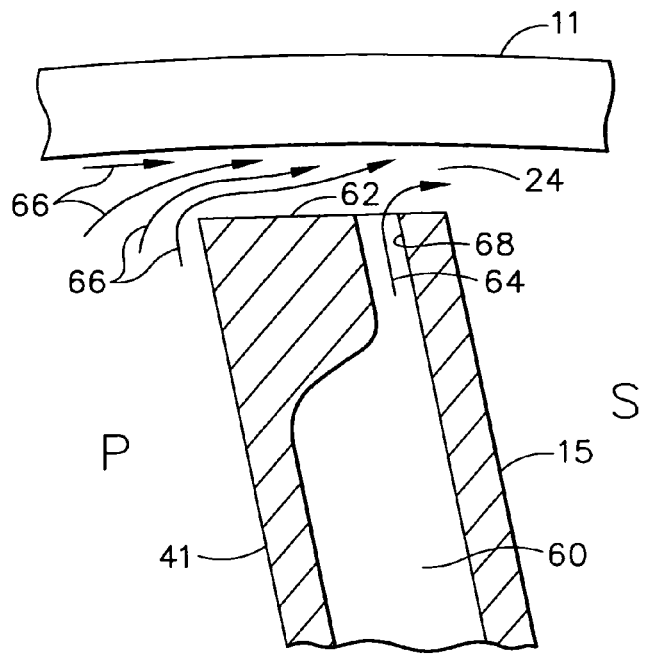
FIG. 7 is a cross-sectional view of a portion of the blade represented in FIG. 6 taken in a plane perpendicular to the plane of FIG. 6 along section 7-7.
Figure 8:
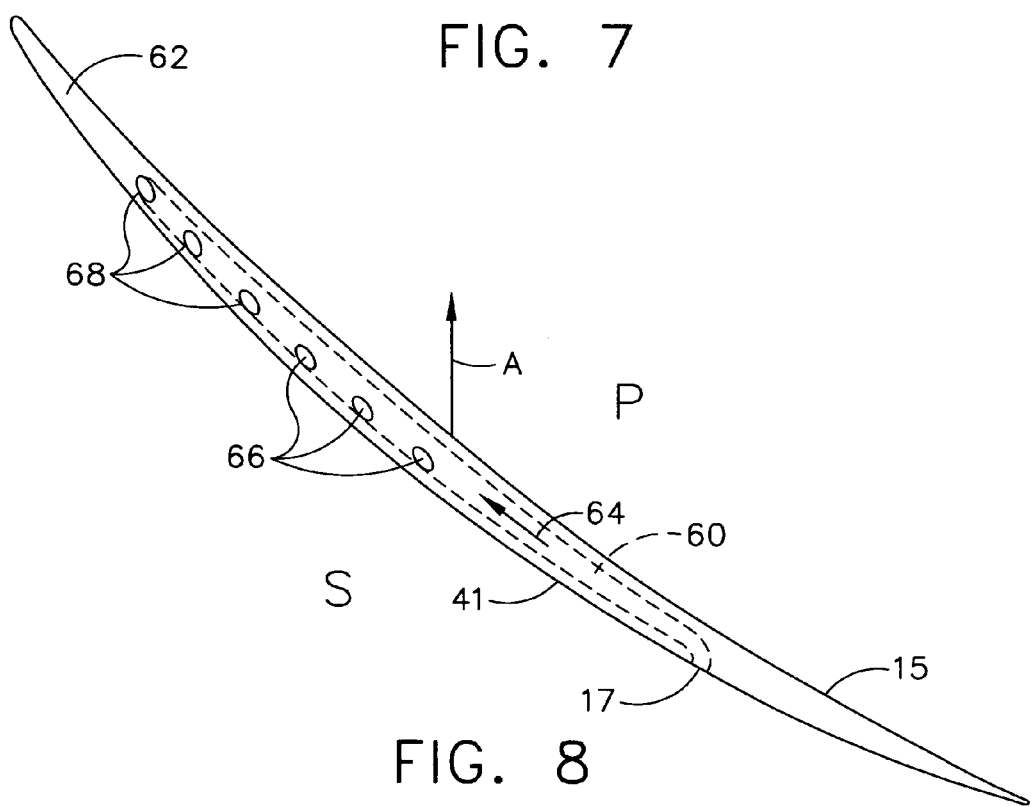
FIG. 8 is a top view of the top of the blade looking down from line 8-8 in FIG. 6.

In some configurations and referring to FIGS. 6, 7, and 8 (where the suction side of the blade is denoted "S" and the pressure side is denoted "P"), internal channels or passageways 60 inside blade 15 provide tip reingestion from slots 17. Air 64 ingested at slots 17 utilizing a centrifugal field of the rotor and/or a prevailing static pressure gradient flows through interior passageways 60, where it is reingested at a location of blade 15 to enhance at least one of performance, aerodynamic stability, or quality of aerodynamic field flow. For example, in some configurations, air 64 is reingested at tip 62 of blade 15 into gap 24 between tip 62 and outer case 11. Air 64 spoils air 66 coming over tip 62 of blade 15 in some configurations by entering gap 24 near an advancing edge of air 66. Air 64 thus creates a mass flow in gap 24 that makes it more difficult for air 66 to pass over tip 62 of blade 15. Therefore, the flow of air 66, which represents a leakage flow, is squeezed closer to outer case 11 and reduced in magnitude. The location at which air flow 64 is reingested thus beneficially alters a tip clearance flow field or vortex.

As blade 15 rotates in direction A, air exits through exit holes 68 in tip 62. An top internal flow path 60 of the plurality of internal flow paths 60 shown in FIG. 6 is represented by hidden lines in FIG. 8.

Figure 9:
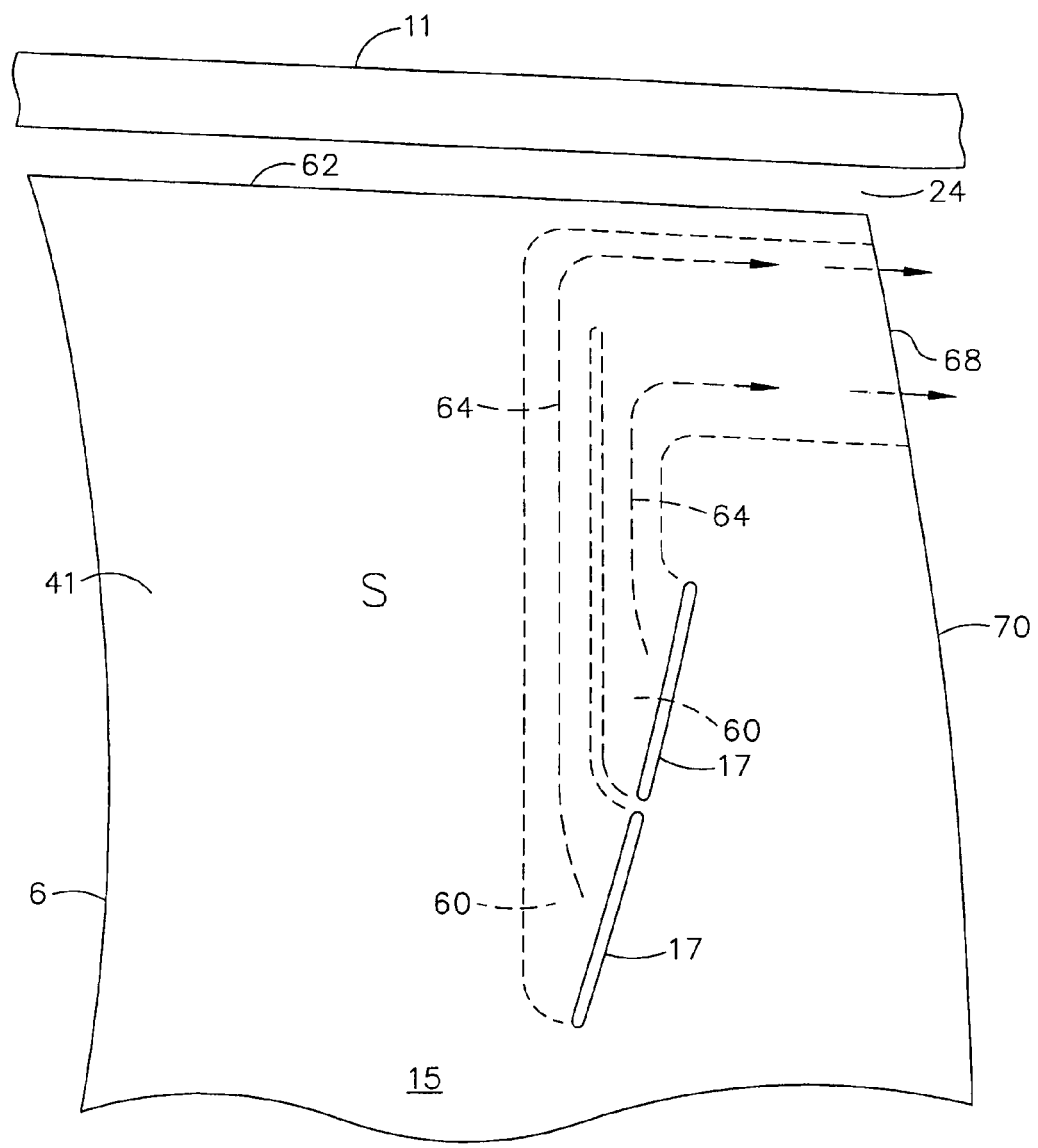
FIG. 9 is a fragmentary view of another configuration of a blade represented in FIG. 3, wherein reingestion occurs at a trailing edge of the blade. Internal passageways in the blade are shown using hidden lines.

In some configurations and referring to FIG. 9, reingestion of air flow 64 occurs at a trailing edge 70 of blade 15. Configurations of this type can enhance air flow past blade 15.

Figure 10:
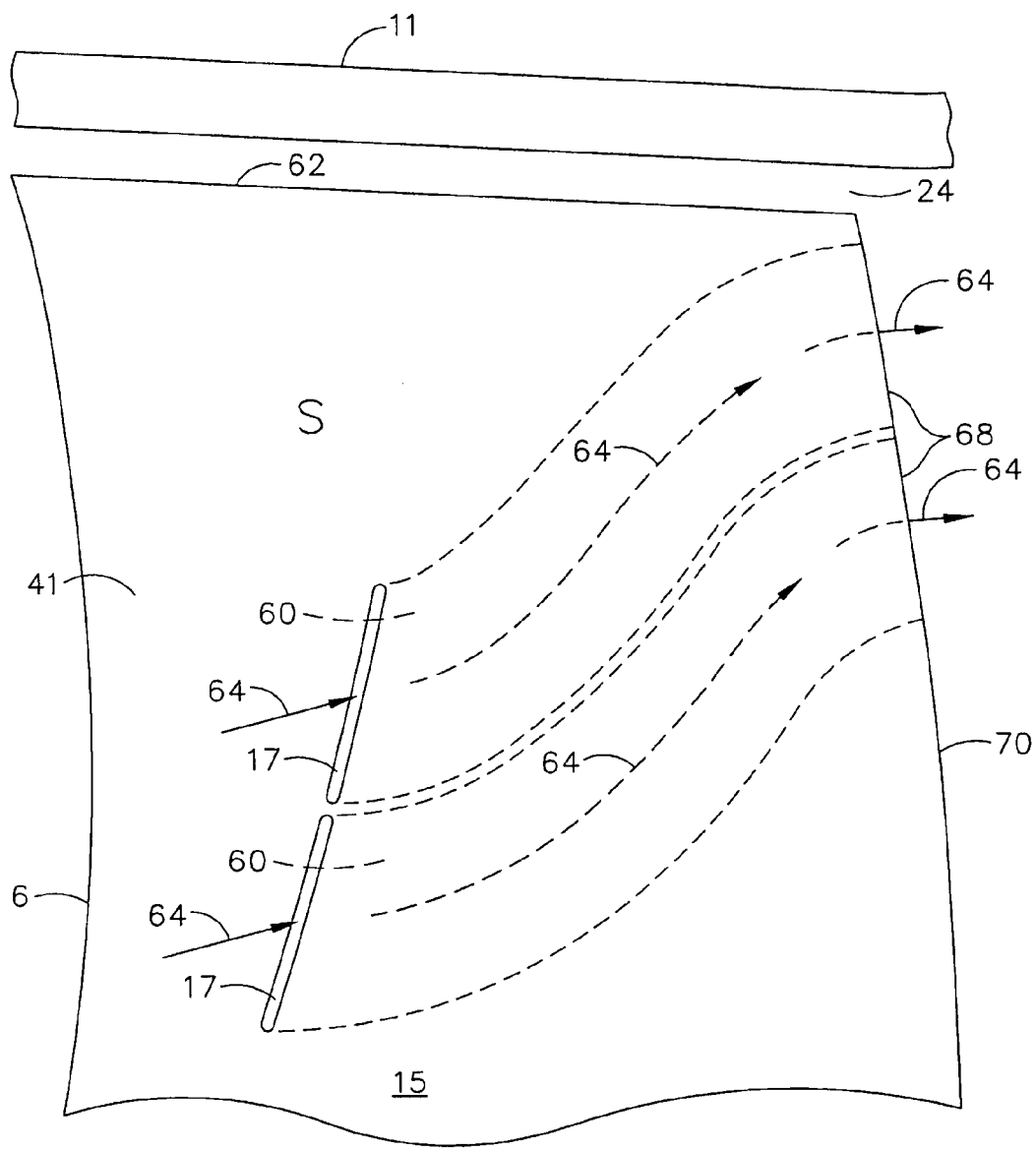
FIG. 10 is a fragmentary view of yet another configuration of a blade represented in FIG. 3, wherein wake dissipation is enhanced by the intake and exhaust channelization of a boundary layer out a trailing edge of the blade.

In some configurations and referring to FIG. 10, wake dissipation is enhanced (i.e., a portion of the wake is partially or fully dissipated) by channeling air flows 64 out in a distributed fashion and at an increased distance from the root (not shown) of blade 15 than inlet slots 17. In the illustrated configuration, a row of slots 17 are forward of shock 20. However, rows of slots 17 can be forward, aft, or on slot 20 in other configurations.

Figure 11:
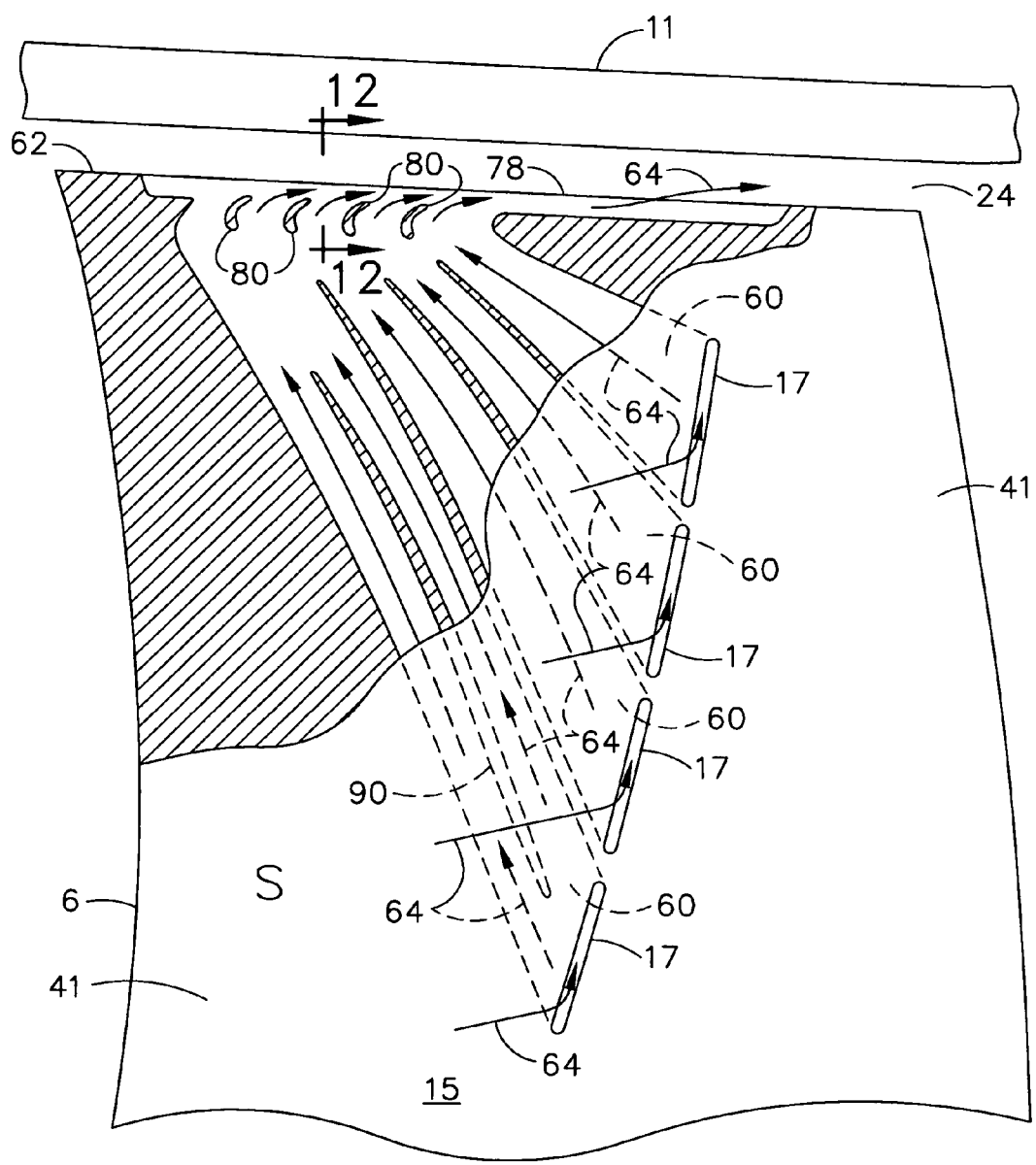
FIG. 11 of another configuration of a blade represented in FIG. 3, showing submerged turning blades in the tip of the blade.
Figure 12:
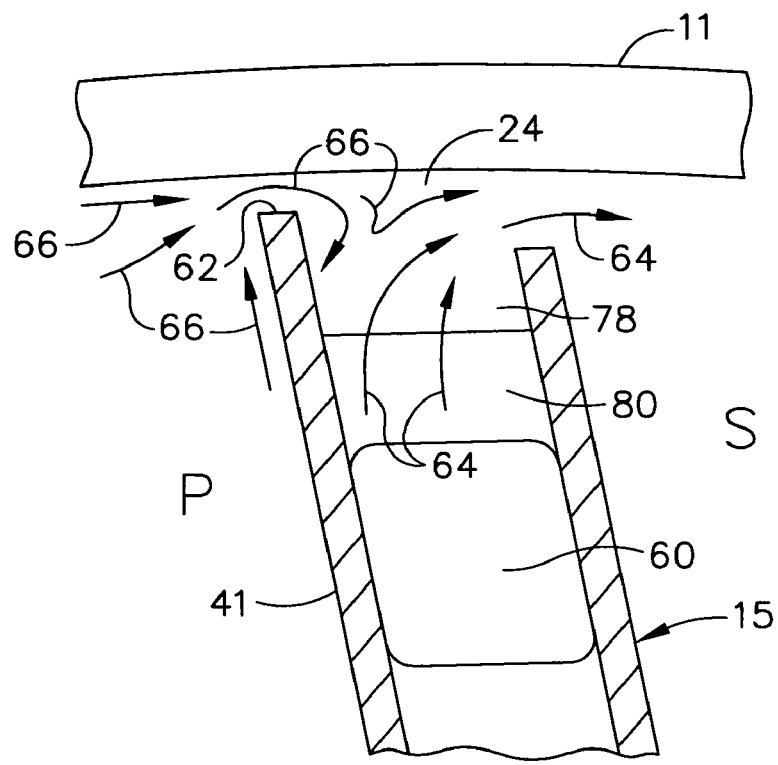
FIG. 12 is a fragmentary cut-away view at right angles to the plane of FIG. 11 along section 12-12 of a portion of the blade shown in FIG. 11 near its tip, showing a submerged turning vane.

In some configurations, as an air flow 64 reaches blade tip 62 and turns a corner, channeling vanes 80 in blade tip 62 channel flow 64 exiting tip 62 to reduce losses. Thus, in some configurations and referring to FIGS. 11 and 12, flow paths 64 are directed forwardly inside blade 15 to a recessed exit region or squealer tip 78 in blade tip 62, having submerged miniature channeling vanes 80. Squealer tip 78 and submerged vanes 80 effectively present a single blade labyrinth seal to leakage flow 66 coming over tip 62 into gap 24 between blade tip 62 and outer case 11. Leakage flow 66 spreads out and produces a pressure drop that results in losses for the leakage flow 66 entering gap 24. Leakage flow 66 then meets with pumping air 64, which adds more mass flow, thereby reducing the amount of leakage flow 66 getting past blade 15.

In some configurations, diffuser vanes (not shown in the figures) are provided in channel 60 near slots 17 to set diffuser area ratios. Also in some configurations, ribs 90 between passageways are configured to prevent flows in the passageways from pumping a single side of the passageways. Channels 60 are also configured to prevent crossflows between the channels in some configurations.

Figure 13:
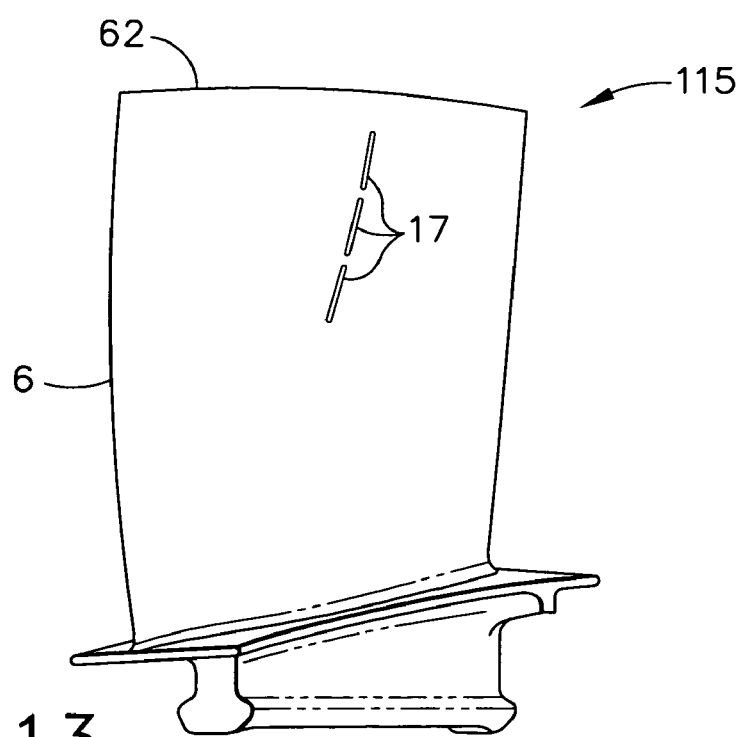
FIG. 13 is a view of another airfoil configuration of the present invention in which the airfoil is a compressor blade rather than a fan blade.

In some configurations and referring to FIG. 13, a blade 115 having slots 17 is used as a compressor blade rather than a fan blade. The configuration of blade 115 has a leading edge 6 contoured in a manner typical of compressor blades.

It will thus be appreciated that various configurations of the present invention provide improvements in at least one of performance, aerodynamic stability, and/or quality of aerodynamic field flow is achieved in various configurations of the present invention. Furthermore, some configurations of the present invention provide an improvement in fan or compressor blade performance that can increase efficiency and stall margin at increased stage compression ratios. In turn, thrust may be increased with reductions in weight and fuel consumption, and fewer stages may be used in a typical compressor. Reduced aeromechanical excitation and improved noise characteristics may also be obtained by improving fan blade design. Lower turbine temperatures may also be obtained from improved fan and compressor blade designs for increasing hot section life.

While the invention has been described in terms of various specific embodiments, those skilled in the art will recognize that the invention can be practiced with modification within the spirit and scope of the claims.

What is claimed is:

1. An airfoil having:
   a root;

a tip;

a leading edge extending from said root to said tip;

a trailing edge extending from said root to said tip; and an outer surface extending between said leading edge and said trailing edge for pressuring air flowable thereover from said leading edge to said trailing edge, said outer surface further comprising one or more slots elongate in a direction extending along at least one line of constant pressure, said one or more slots are selected to preclude or reduce circulation within said slots, and said one or more slots configured to bleed a boundary layer from said outer surface to said tip utilizing one or more passageways within said airfoil.

2. An airfoil in accordance with claim 1 wherein said slots are elongate along contour lines of equal static pressure when said airfoil is operated transonically to form a passage shock.

3. An airfoil in accordance with claim 1 wherein said slots are downstream of the passage shock.

4. An airfoil in accordance with claim 1 wherein said slots are upstream of the passage shock.

5. An airfoil in accordance with claim 1 wherein said one or more passageways further comprise channeling vanes configured to channel air exiting the tip of the airfoil.

6. An airfoil in accordance with claim 5 further comprising a set of diffuser vanes configured to set diffuser area ratios.

7. An airfoil in accordance with claim 1 having a leading edge contoured in a combined sweep manner from the root to the tip of the airfoil.

8. A fan utilizing an airfoil in accordance with claim 1.

9. A compressor utilizing an airfoil in accordance with claim 1.

10. An airfoil in accordance with claim 1 wherein said passageways include pumping passages and ribs configured to prevent flows in the passageways from pumping a single side of said passageways.

11. A transonic airfoil on a rotor, said airfoil configured to bleed off a portion of a lossy boundary layer along a surface extending between a leading edge and a trailing edge of the airfoil into internal channels of the airfoil using one or more slots elongate in a direction extending along at least one line of constant pressure, said one or more slots facilitate reducing circulation within said slots, utilizing either or both of a centrifugal field of the rotor or a prevailing static pressure gradient, to locations of the airfoil where the bled off portion is reingested to enhance at least one of performance or aerodynamic stability of the rotor.

12. A transonic airfoil in accordance with claim 11 wherein the locations of the airfoil where the bled off portion is reingested are at a tip of the airfoil.

13. A transonic airfoil in accordance with claim 11 wherein the locations of the airfoil where the bled off portion is reingested are selected to beneficially alter a tip clearance flow field or vortex.

14. A transonic airfoil in accordance with claim 11 wherein the locations of the airfoil where the bled off portion is reingested are at a trailing edge of the airfoil.

15. A transonic airfoil in accordance with claim 11 wherein the locations of the airfoil where the bled off portion is reingested are selected to partially or fully dissipate a portion of a wake of the rotor.

16. A transonic airfoil in accordance with claim 11 further comprising miniature vanes submerged from a tip of the airfoil.

17. A method for operating an airfoil on a rotor, said method comprising:

utilizing either or both of a centrifugal field of the rotor or a prevailing static pressure gradient to bleed off a portion of a lossy boundary layer along a surface extending between a leading edge and a trailing edge of the airfoil into internal channels of the airfoil using one or more slots elongate in a direction extending along at least one line of constant pressure, said one or more slots facilitate reducing circulation within said slots; and reingesting the bled off portion at locations of the airfoil selected to enhance at least one of performance or aerodynamic stability of the rotor.

18. A method in accordance with claim 17 wherein said reingesting the bled off portion comprises reingesting the bled off portion at a tip of the airfoil.

19. A method in accordance with claim 17 wherein reingesting the bled off portion comprises reingesting the bled off portion at locations of the airfoil selected to beneficially alter a tip clearance flow field or vortex.

20. A method in accordance with claim 17 wherein reingesting the bled off portion comprises reingesting the bled off portion at locations selected to partially or fully dissipate a portion of a wake of the rotor.

* * * * *